United States Patent
Zang et al.

(10) Patent No.: US 10,203,580 B2
(45) Date of Patent: Feb. 12, 2019

(54) ELECTRODE APPLICABLE IN LIQUID CRYSTAL DISPLAY, ARRAY SUBSTRATE, DISPLAY PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Pengcheng Zang, Beijing (CN); Weiyun Huang, Beijing (CN); Xiaojing Qi, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 91 days.

(21) Appl. No.: 15/266,171

(22) Filed: Sep. 15, 2016

(65) Prior Publication Data
US 2017/0108719 A1    Apr. 20, 2017

(30) Foreign Application Priority Data
Oct. 20, 2015    (CN) .......................... 2015 1 0684278

(51) Int. Cl.
*G02F 1/137*    (2006.01)
*G02F 1/1343*    (2006.01)

(52) U.S. Cl.
CPC .......... *G02F 1/137* (2013.01); *G02F 1/13439* (2013.01); *G02F 1/134309* (2013.01);
(Continued)

(58) Field of Classification Search
CPC .......... G02F 1/134309; G02F 1/13439; G02F 2001/134372; G02F 2201/123; G02F 2201/124
See application file for complete search history.

(56) References Cited

U.S. PATENT DOCUMENTS

2002/0131005 A1    9/2002 Yang
2013/0003007 A1    1/2013 Zhang
(Continued)

FOREIGN PATENT DOCUMENTS

CN    1690815 A    11/2005
CN    1696803 A    11/2005
(Continued)

OTHER PUBLICATIONS

English translation of Chinese Patent No. CN 1696803; translation downloaded from https://encrypted.google.com/patents/CN1696803A?cl=en on Feb. 7, 2018.*
(Continued)

*Primary Examiner* — Angela K Davison
(74) *Attorney, Agent, or Firm* — Ladas & Parry LLP

(57) ABSTRACT

An electrode applicable in liquid crystal display (LCD), an array substrate, a display panel, and a display device are provided. The electrode applicable in LCD includes a plurality of electrode comb teeth with a slit therebetween, adjacent electrode comb teeth being connected to each other at one end of each comb tooth; the other ends of the adjacent electrode comb teeth forming an opening, at least one protrusion being provided between the adjacent electrode comb teeth at the opening end; and the protrusion being connected to the electrode comb tooth.

17 Claims, 8 Drawing Sheets

(52) U.S. Cl.
CPC ............ *G02F 2001/134372* (2013.01); *G02F 2201/123* (2013.01); *G02F 2201/14* (2013.01); *G02F 2201/15* (2013.01)

(56) References Cited

U.S. PATENT DOCUMENTS

2014/0152934 A1* 6/2014 Huh et g02f ..... G02F 1/133707
                                                       349/43
2014/0354931 A1* 12/2014 Kurasawa ......... G02F 1/134336
                                                       349/124

FOREIGN PATENT DOCUMENTS

| CN | 201654402 U | 11/2010 |
| CN | 102236219 A | 11/2011 |
| CN | 10249550 A | 6/2012 |

OTHER PUBLICATIONS

The First Chinese Office Action dated Oct. 31, 2017; Appln. 201510684278.X.

* cited by examiner

_US 10,203,580 B2_

ELECTRODE APPLICABLE IN LIQUID CRYSTAL DISPLAY, ARRAY SUBSTRATE, DISPLAY PANEL AND DISPLAY DEVICE

TECHNICAL FIELD

Embodiments of the present disclosure relate to an electrode applicable in liquid crystal display (LCD), an array substrate, a display panel and a display device.

BACKGROUND

In Fringe Field Switching (FFS) technology, a common electrode and a pixel electrode insulated from each other are both disposed on an array substrate located at one side of a LC layer; the pixel electrode is designed to be strip electrodes while the common electrode is designed to be a plate electrode, that is, the pixel electrode includes a plurality of electrode comb teeth with a slit therebetween, and adjacent electrode comb teeth are connected to each other at one end of each comb tooth; the other end of the adjacent electrode comb teeth forms an opening; in this way, parabola-shaped electric field lines are generated, and LC molecules are rotated under an electric field having electric field vectors in both vertical direction and horizontal direction so that transmittance of the display device can be improved.

A positive LC has excellent stability and response time, thus the FFS technology usually utilizes the positive LC in pixel design. With the increasingly wider application of touch-control screens, problems that the positive LC would generate trace mura when subjected to an applied pressure draws more and more attentions.

SUMMARY

Embodiments of the present disclosure provide an electrode applicable in liquid crystal display (LCD), an array substrate, a display panel and a display device.

According to the embodiments of the present disclosure, an electrode applicable in liquid crystal display (LCD), including a plurality of electrode comb teeth with a slit between any two adjacent electrode comb teeth, the adjacent electrode comb teeth being connected to each other at one end of each comb teeth; the other ends of the adjacent electrode comb teeth forming an opening, and at least one protrusion being provided between the adjacent electrode comb teeth at the opening end; the at least one protrusion being connected to one of the adjacent electrode comb teeth.

For example, one protrusion is disposed between the adjacent electrode comb teeth at the opening end.

For example, the protrusion is oriented towards a center of the electrode from both sides of the electrode in a direction perpendicular to the electrode comb tooth.

For example, the protrusion has a length greater than half of a distance between the adjacent electrode comb teeth.

For example, a distance from the protrusion to the opening end is smaller than 10 μm.

For example, a length of a portion of the protrusion connected to the electrode comb tooth in a length direction of the electrode comb tooth is smaller than 10 μm.

According to the embodiments of the present disclosure, an array substrate is provided, including the electrode applicable in LCD, which includes strip electrodes, and a plate electrode disposed to be insulated from and opposite to the strip electrodes.

According to the embodiments of the present disclosure, a display panel is provided, including the array substrate and a liquid crystal (LC) layer; an electric field being generated between the strip electrodes and the plate electrode of the array substrate to control a deflection of LC molecules in the LC layer.

According to the embodiments of the present disclosure, a display device is provided, including the display panel.

For example, one protrusion is disposed at the opening end of each of the electrode comb teeth.

For example, the protrusion is disposed at the opening end of part of the electrode comb teeth.

For example, the protrusion is disposed at the opening end of every other one of the electrode comb teeth.

For example, a cross-section of the protrusion is a triangle, semi-circle or arc.

For example, the protrusion is formed integrally with the electrode comb tooth.

BRIEF DESCRIPTION OF THE DRAWINGS

Embodiments of the present disclosure will be illustrated in more details in connection with the drawings so as to enable those skilled in the art to understand the disclosure more clearly, in which.

DETAILED DESCRIPTION

Technical solutions according to the embodiments of the present disclosure will be described in details as below in conjunction with the accompanying drawings of embodiments of the present disclosure. It is apparent that the described embodiments are only part of but not all of exemplary embodiments of the present disclosure. Based on the described embodiments of the present disclosure, various other embodiments can be obtained by those of ordinary skill in the art without creative labor and those embodiments shall fall into the scope of the present disclosure.

Figure 1:
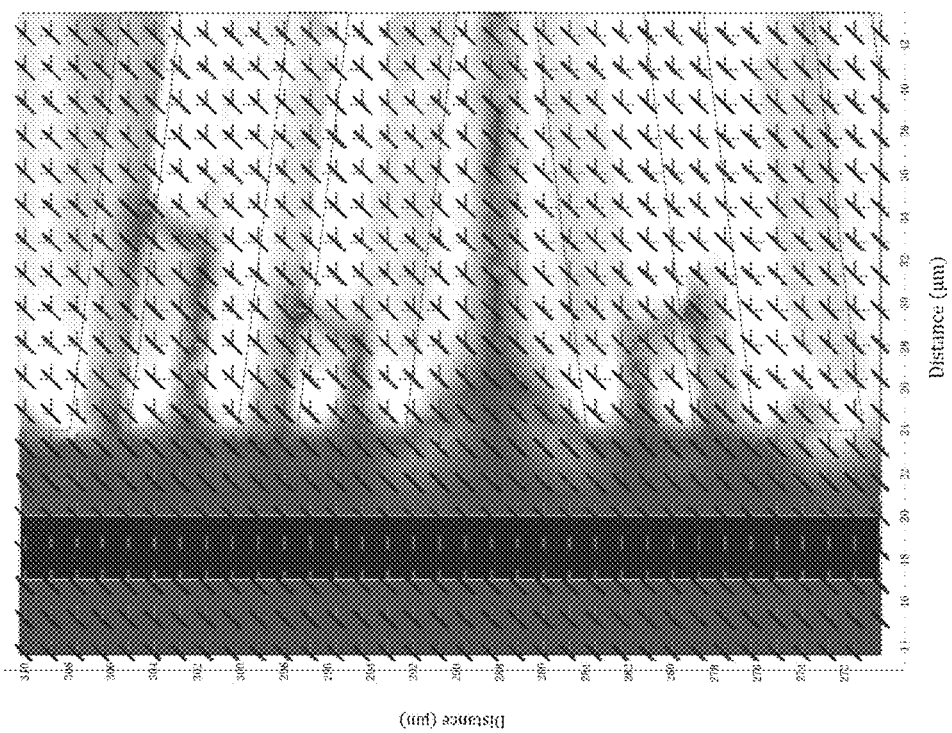
FIG. 1 is a simulation diagram generated by TECHWIZ software illustrating an electric field vector obtained by using a traditional strip electrodes.
Figure 2:
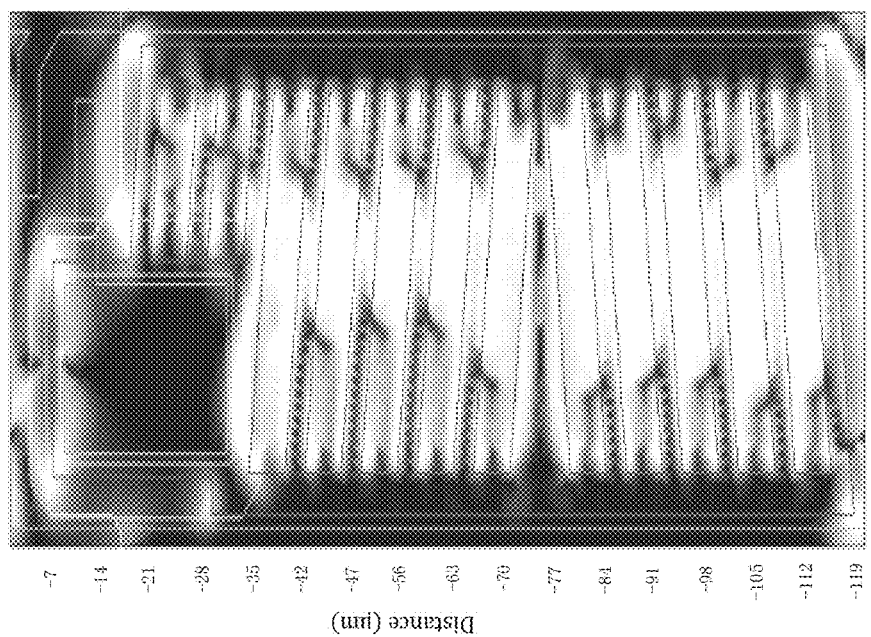
FIG. 2 is a simulation diagram generated by TECHWIZ software illustrating light transmittance obtained by using a traditional strip electrodes.

FIG. 1 and FIG. 2 are simulation diagrams generated by TECHWIZ software illustrating an electric field vector and a light transmittance of traditional strip electrodes, respectively. The inventors of the present disclosure realized that, when using such strip electrodes, an electric field at regions of both ends and a region adjacent to a center of the strip electrode has zero or extremely small electric field component in a vertical direction, which results in a relatively lower light transmittance at these regions.

Figure 3:
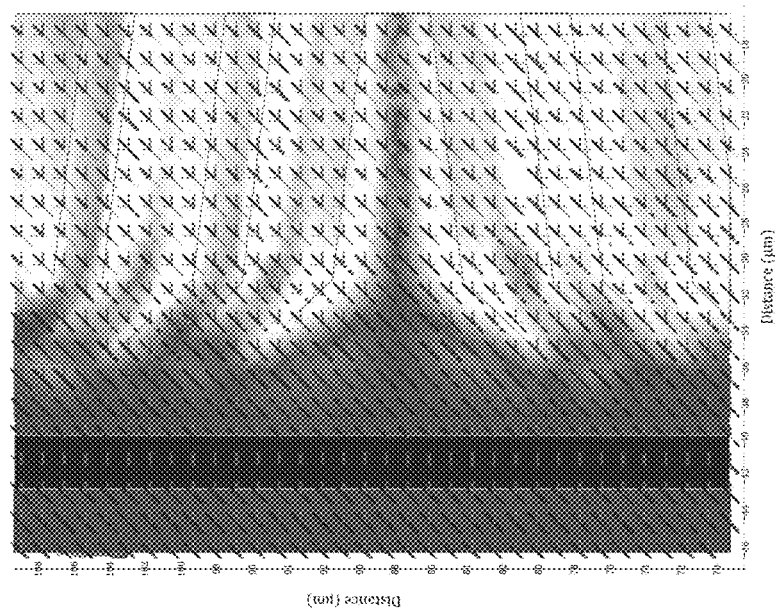
FIG. 3 is a simulation diagram generated by TECHWIZ software illustrating an electric field vector obtained by using strip electrodes with corners.
Figure 4:
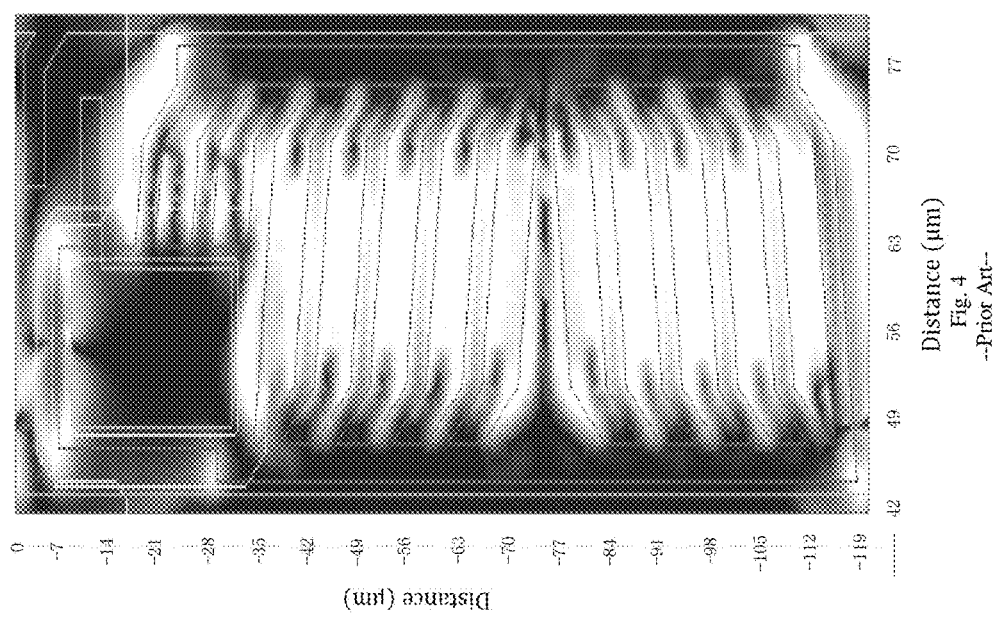
FIG. 4 is a simulation diagram generated by TECHWIZ software illustrating light transmittance obtained by using traditional strip electrodes with corners.

The design in which an opening end of the strip electrode is additionally provided with a corner can decrease trace mura, however, as illustrated in FIG. 3 and FIG. 4, which are simulation diagrams generated by TECHWIZ software illustrating an electric field vector and light transmittance obtained by using a traditional strip electrodes each with a corner, when using the strip electrodes, each of which has a corner the electric field at the regions of both ends and the region adjacent to the center of the strip electrode has zero or extremely small electric field component in the vertical direction, which results in a relatively lower light transmittance at these regions.

Figure 5:
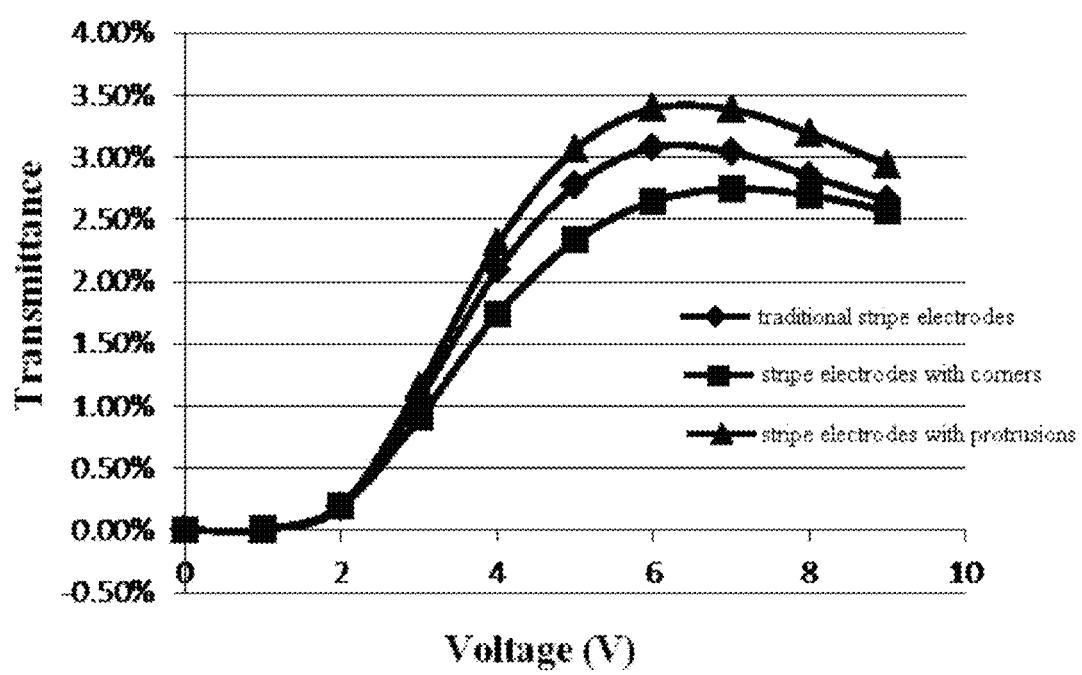
FIG. 5 illustrates comparisons between light transmittances of traditional strip electrodes, strip electrodes with corners, and strip electrodes with protrusions provided by a first embodiment of the present disclosure, under different voltages.

Comparisons of light transmittances given a pixel pitch of 37.5 μm under different voltages are illustrated in FIG. 5; pixel regions in the traditional design and the design with corner both have relatively lower transmittance.

Although the design with a corner can reduce the trace mura, it can not solve the problem of relatively lower transmittance.

The First Embodiment

Figure 6:
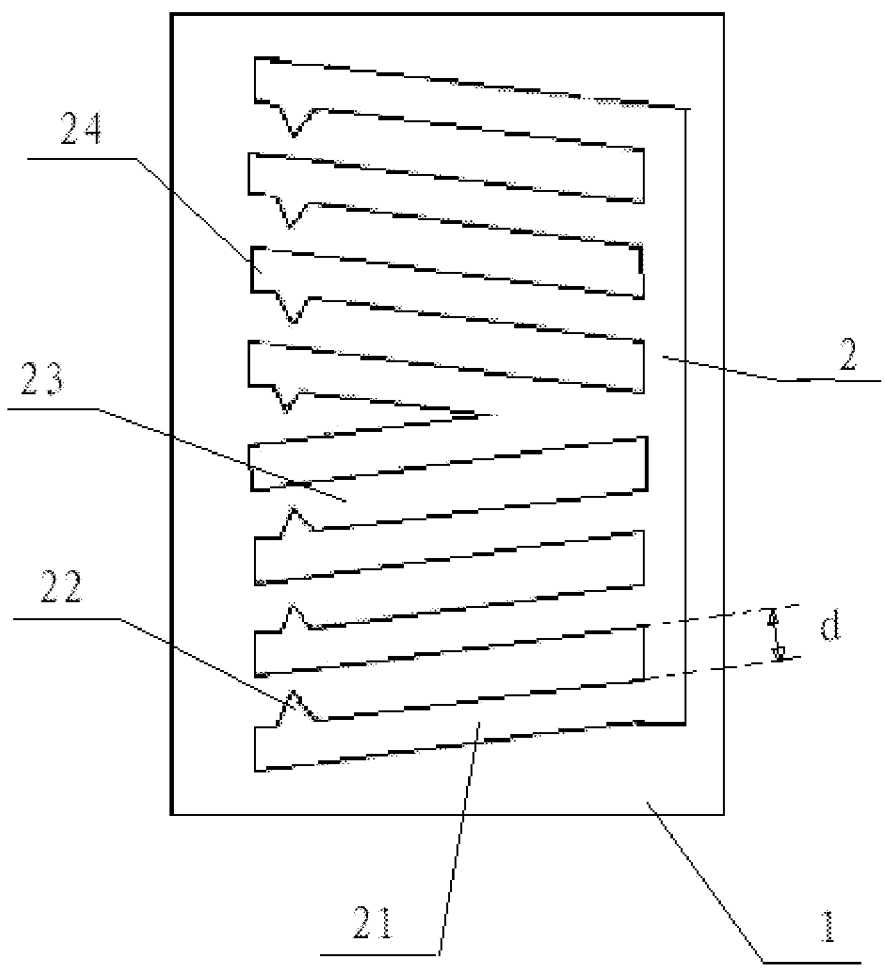
FIG. 6 is a schematically structural diagram of the strip electrodes with protrusions provided by the first embodiment of the present disclosure.

As illustrated in FIG. 6, the present embodiment provides an electrode applicable in LCD including a plurality of electrode comb teeth 21 with a slit or spacing between any two adjacent teeth, the adjacent electrode comb teeth 21 are connected to each other at one end of each electrode comb teeth; the other ends of the electrode comb teeth 21 form an opening; at the opening end 24 at least one protrusion 22 is disposed between the adjacent electrode comb teeth 21; the protrusion 22 is connected to the electrode comb tooth 21.

Figure 7:
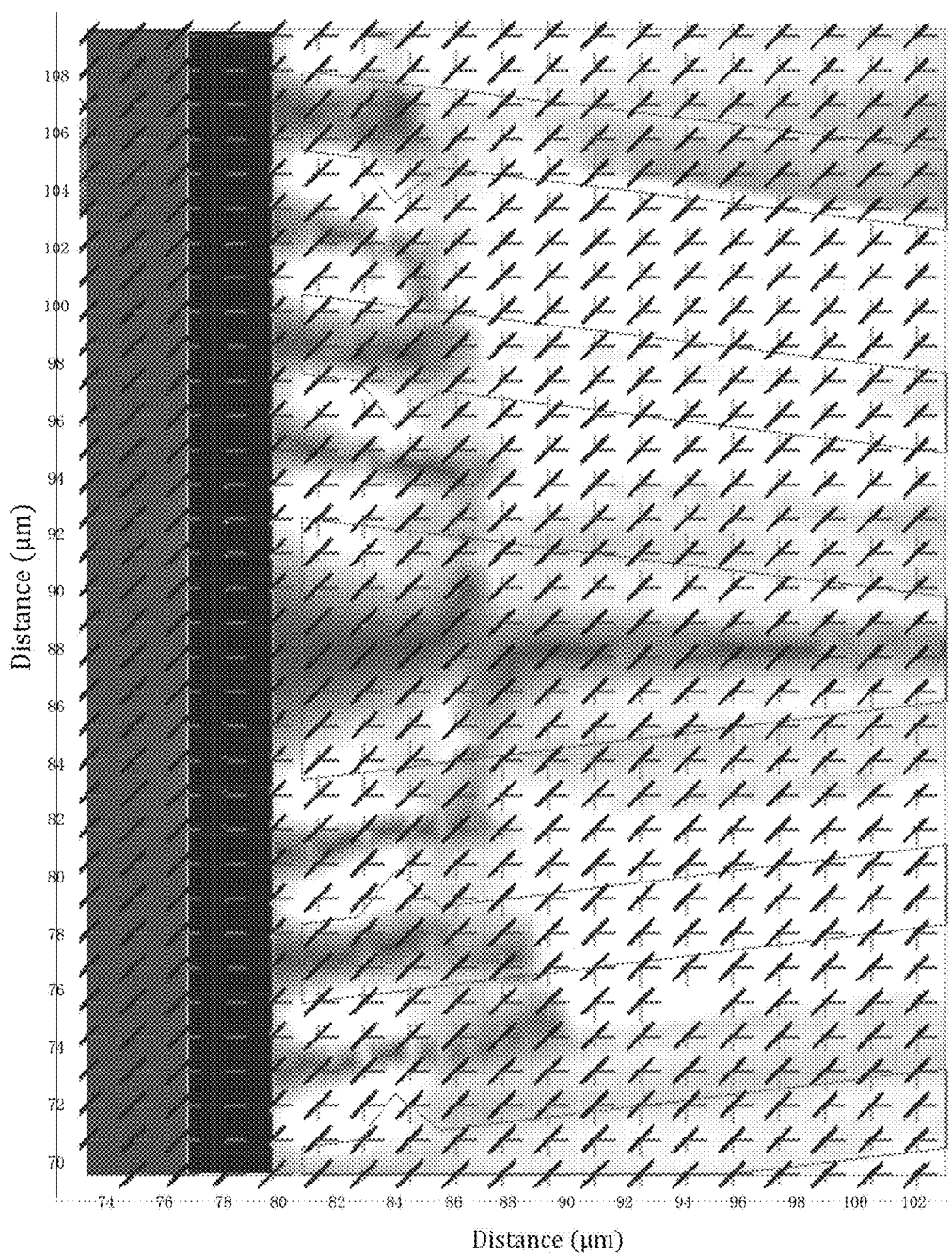
FIG. 7 is a simulation diagram generated by TECHWIZ software illustrating an electric field vector obtained by using the strip electrodes with protrusions.
Figure 8:
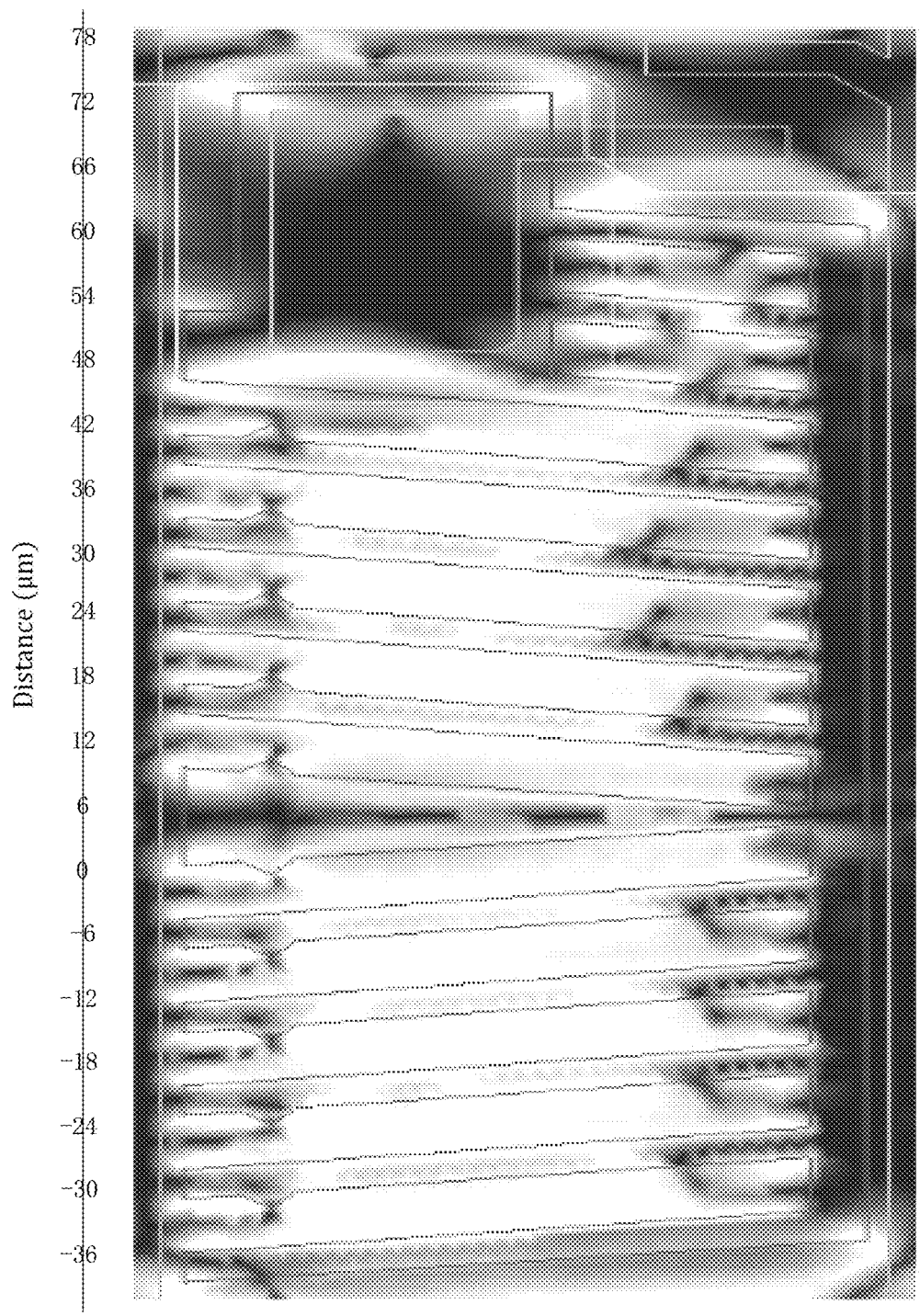
FIG. 8 is a simulation diagram generated by TECHWIZ software illustrating light transmittance obtained by using the strip electrodes with protrusions.
Figure 9:
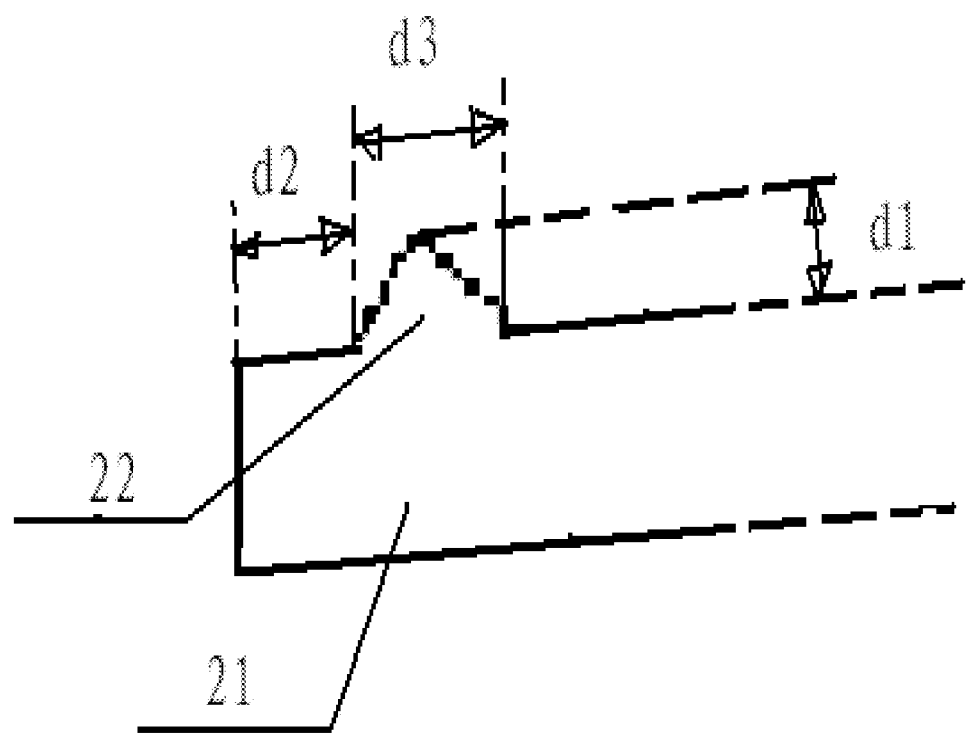
FIG. 9 is an enlarged view of the strip electrodes with protrusions provided by the first embodiment of the present disclosure.

As illustrated in FIG. 7 and FIG. 8 which are respectively simulation diagrams generated by TECHWIZ software illustrating an electric field vector and light transmittance of pixel electrodes 2 with protrusions 22 provided by the present embodiment. At the opening end 24 of the pixel electrode 2, an electric field at the regions of both ends and an region adjacent to a center of the strip electrodes with the protrusions 22 has relatively larger electric field components in both vertical and horizontal directions, which leads to a relatively higher transmittance at these regions, thereby effectively mitigating the defect of lower transmittance while eliminating the trace mura.

For example, one protrusion 22 can be disposed between adjacent electrode comb teeth 21 at the opening end 24, although the embodiments of the present disclosure are not limited thereto. For example, as illustrated in FIG. 6, two protrusions 22 can also be disposed in opposite to each other between the adjacent electrode comb teeth 21 at the opening end 24, and in such case the protrusion 22 can be designed such that a space 23 between the adjacent electrode comb teeth 21 can accommodate two oppositely disposed protrusions 22; an amount of the protrusions 22 as disposed and a space 23 between the adjacent electrode comb teeth 21 shall meet precision requirements of the manufacturing process.

For example, the protrusion 22 is orientated towards a center of the electrode from both sides of the electrode in a direction perpendicular to the electrode comb tooth 21.

By simulating, the inventor of the present disclosure has realized that, the above-mentioned orientation arrangement of the protrusion 22 is advantageous for improving the transmittance of the pixel electrode 2, although the embodiments of the present disclosure are not limited thereto. For example, the orientation of the protrusion 22 can be arranged in other ways, which also can function to improve the transmittance.

For example, the protrusion 22 is disposed at the opening end of each and every electrode comb tooth; or, the protrusion 22 is disposed at the opening end of part of the electrode comb teeth. For example, the protrusion 22 is disposed at every other one of the electrode comb teeth, although the embodiments of the present disclosure are not limited thereto.

For example, as illustrated in FIG. 7, the protrusion 22 has a length greater than half of a distance between the adjacent electrode comb teeth 21. When a single protrusion 22 is disposed between the adjacent electrode comb teeth 21, the length d1 of the protrusion 22 is greater than half of the distance between the adjacent electrode comb teeth 21; in this way, a patterning process can be performed to the protrusion in a more convenient way, and it is possible to limit an region with relatively lower transmittance at the opening end 24.

For example, a distance d2 from the protrusion 22 to the opening end 24 is smaller than about 10 μm.

It is understood that the distance from the protrusion 22 to the opening end 24 is arranged to be as small as possible so that the region at the opening end 24 having relatively low transmittance can be narrowed as far as possible, which correspondingly expands a central region of the pixel electrode 2 having relatively high transmittance and felicitates improving the transmittance of the entire pixel electrode 2.

For example, a length d3 of a portion of the protrusion 22 that is connected to the electrode comb tooth 21 in a length direction of the electrode comb tooth is smaller than about 10 μm.

For example, a cross-section of the protrusion 22 can be a triangle, semi-circle or arc. The protrusion 22 can be formed integrally with the electrode comb tooth, although the embodiments of the present disclosure are not limited thereto.

It is understood that the above-mentioned d3 can have a value which meets the precision requirements of the manufacture process and meanwhile being as small as possible to facilitate narrowing the region having lower transmittance.

The Second Embodiment

The present embodiment provides an array substrate including: strip electrodes of the electrode applicable in LCD; and a plate electrode 1 disposed to be insulated from and opposite to the strip electrodes.

The Third Embodiment

The present embodiment provides a display panel including the array substrate and a liquid crystal (LC) layer. An electric field is generated between the strip electrodes and the plate electrode 1 of the array substrate so as to control a deflection of LC molecules in the LC layer.

The Fourth Embodiment

The present embodiment provides a display device including the display panel.

The second, third and fourth embodiments can eliminate the trace mura while improving the transmittance of the pixel electrode region.

In the electrode applicable in LCD, the array substrate, the display panel and the display device as provided by the embodiments of the present disclosure, at least one protrusion is disposed between adjacent electrode comb teeth at an opening end, which allows an electric field at regions of both ends and an region adjacent to a center of the strip electrodes with the protrusion to have relatively larger components in both vertical direction and horizontal direction so that the transmittance at these regions can be relatively high. In this way, the defect of low transmittance can be effectively mitigated while eliminating trace mura.

The described above are just exemplary embodiments to explain the principle of the present disclosure and the disclosure is not intended to be limited thereto. An ordinary person in the art can make various variations and modifications to the present disclosure without departure from the spirit and the scope of the present disclosure, and such variations and modifications shall fall in the scope of the present disclosure.

The present application claims the benefits and priority of the Chinese patent application No. 201510684278.X filed on Oct. 20, 2015 and entitled "AN ELECTRODE APPLICABLE IN LIQUID CRYSTAL DISPLAY, ARRAY SUBSTRATE, DISPLAY PANEL AND DISPLAY DEVICE," which is incorporated herein by reference entirely.

What is claimed is:

1. An electrode in a liquid crystal display (LCD), comprising,
a plurality of electrode comb teeth with a slit between any two adjacent electrode comb teeth, the adjacent electrode comb teeth being connected to each other at one end of each comb tooth; the opposite ends of the adjacent electrode comb teeth forming an opening end, and at least one protrusion being provided between the adjacent electrode comb teeth at the opening end; the at least one protrusion being connected to one of the adjacent electrode comb teeth, and having a greater than half of a distance between the adjacent electrode comb teeth in a direction perpendicular to the electrode comb tooth, wherein the at least one protrusion is oriented towards a center of the electrode from two sides of the electrode in a direction perpendicular to the electrode comb tooth.

2. The electrode in a LCD according to claim 1, wherein a distance from the at least one protrusion to the opening end is smaller than 10 µm.

3. The electrode in a LCD according to claim 1, wherein a length d3 of a portion of the at least one protrusion connected to the electrode comb tooth in a length direction of the electrode comb tooth is smaller than 10 µm.

4. An array substrate, comprising the electrode in the LCD according to claim 1, and a plate electrode disposed to be insulated from and opposite to the plurality of electrode comb teeth.

5. A display panel, comprising the array substrate according to claim 4 and a liquid crystal (LC) layer; an electric field being generated between the strip electrodes and the plate electrode of the array substrate to control a deflection of LC molecules in the LC layer.

6. A display device comprising the display panel according to claim 5.

7. The electrode in a LCD according to claim 1, wherein the at least one protrusion is disposed at the opening end of each of the electrode comb teeth.

8. The electrode in a LCD according to claim 1, wherein the at least one protrusion is disposed at the opening end of part of the electrode comb teeth.

9. The electrode in a LCD according to claim 8, wherein the at least one protrusion is disposed at the opening end of every other one of the electrode comb teeth.

10. The electrode in a LCD according to claim 1, wherein a cross-section of the at least one protrusion is a triangle, semi-circle or arc.

11. The electrode in a LCD according to claim 1, wherein the at least one protrusion is formed integrally with the electrode comb tooth.

12. A liquid crystal display (LCD), comprising an electrode,
wherein the electrode comprises a plurality of electrode comb teeth with a slit between any two adjacent electrode comb teeth, the plurality of the electrode comb teeth includes two groups of teeth slanting at two different angles along two different extending directions, respectively, the adjacent electrode comb teeth being connected to each other at one end of each comb tooth; the opposite ends of any adjacent electrode comb teeth in the two groups forming an opening end, and a single protrusion being provided between the adjacent electrode comb teeth at the opening ends; the protrusion being connected to one of the adjacent electrode comb teeth, wherein the protrusion is oriented towards a center of the electrode from two sides of the electrode in a direction perpendicular to the electrode comb tooth.

13. The LCD according to claim 12, wherein the protrusion has a length greater than half of a distance between the adjacent electrode comb teeth in a direction perpendicular to the electrode comb tooth.

14. The LCD according to claim 12, wherein a distance from the protrusion to the opening end is smaller than 10 µm.

15. The LCD according to claim 12, wherein a length of a portion of the protrusion connected to the electrode comb tooth along an extending direction of the electrode comb tooth is smaller than 10 µm.

16. The LCD according to claim 12, wherein the protrusion is disposed at the opening end of each of the electrode comb teeth.

17. The LCD according to claim 12, wherein the protrusion is disposed at the opening end of every other one of the electrode comb teeth.

* * * * *